Nov. 21, 1961   G. L. WISER   3,009,845
HIGH IMPACT STRENGTH TRANSPARENT ENCLOSURE
Filed Aug. 8, 1956   2 Sheets-Sheet 1

INVENTOR.
GEORGE L. WISER
BY
*George C. Sullivan*
Agent

Nov. 21, 1961  G. L. WISER  3,009,845
HIGH IMPACT STRENGTH TRANSPARENT ENCLOSURE
Filed Aug. 8, 1956  2 Sheets-Sheet 2

INVENTOR.
GEORGE L. WISER
BY
*George C. Sullivan*
Agent

United States Patent Office 3,009,845
Patented Nov. 21, 1961

3,009,845
HIGH IMPACT STRENGTH TRANSPARENT ENCLOSURE
George L. Wiser, Northridge, Calif., assignor to Lockheed Aircraft Corporation, Burbank, Calif.
Filed Aug. 8, 1956, Ser. No. 602,823
5 Claims. (Cl. 154—2.7)

This invention relates generally to transparent enclosures and more particularly to a windshield having a high impact strength for protecting personnel and equipment inside the enclosure of an aircraft or other vehicle adapted to move at relatively high velocities. Birds, rocks or other flying objects, even though they are of relatively small mass, may exert tremendous impact pressures when slammed against the windshield of an aircraft or the like due to the vehicle velocity. These high impact pressures are often of sufficient magnitude to shatter the windshield and shower the enclosure with high velocity particles of glass or the like. This is true even with so-called shatter-proof or bird-resistant windshields constructed according to the teachings in the prior art.

Essentially this invention involves combining, with a conventional windshield, an edge loaded layer of tough, resilient transparent material and an unloaded, thin layer of somewhat stiff and nonresilient transparent material. The two layers are laminated together and to the inside surface of the transparent enclosure for decelerating the high speed particles hurled off the structurally loaded layers when the windshield is shattered.

In the conventional bird-resistant windshield a tough and resilient vinyl layer is interposed between two layers of a rigid transparent material such as glass, polyester resin (sierracin), methyl methacrylate resin (plexiglass) or the like. The edges of the laminated layers are secured by bolts or other suitable fastening devices to the frame structure around the windshield. When an object strikes the laminated windshield the tough resilient vinyl layer is relied upon to absorb much of the impact energy and prevent entry of the object. The resiliency of the vinyl layer, however, may allow the hard and somewhat brittle layers to be shattered creating a dangerous condition inside the enclosure. At the higher cruising velocities of modern aircraft the dangers to the pilot and other crew members inside the cockpit enclosure is considered serious using conventional bird-resistant windshield constructions, even with very thick laminated layers, inasmuch as the hard inner layer as conventionally used is subject to peeling in the area of impact to release fragments thereof at high velocity into the cockpit enclosure even though it might not be completely shattered.

An object of this invention is to provide a transparent enclosure for aircraft or the like which is capable of withstanding high impact loads such as those produced by birds or other flying objects striking the windshield when moving at high speed relative to the aircraft without releasing high velocity particles of the enclosure from the inside surface thereof even though the rigid primary structural layers of the enclosure may be shattered.

Another object of this invention is to provide a transparent enclosure for aircraft or the like which is optically efficient with little or no distortion.

Another object of this invention is to provide a laminated transparent enclosure for safely absorbing high impact loads which may be constructed from commercially available materials using conventional methods of manufacture.

Still another object of this invention is to provide a transparent enclosure construction for protecting persons and equipment inside the enclosure, which is comparable in thickness and weight to conventional aircraft bird-resistant windshields. Because the construction is comparable in thickness and weight to conventional windshields it may be conveniently used in making replacement windshields for existing aircraft to provide a greater margin of flight safety.

Further and other objects will become apparent from a reading of the following description especially when considered in combination with the accompanying drawing wherein like numerals refer to like parts.

Figure 1:
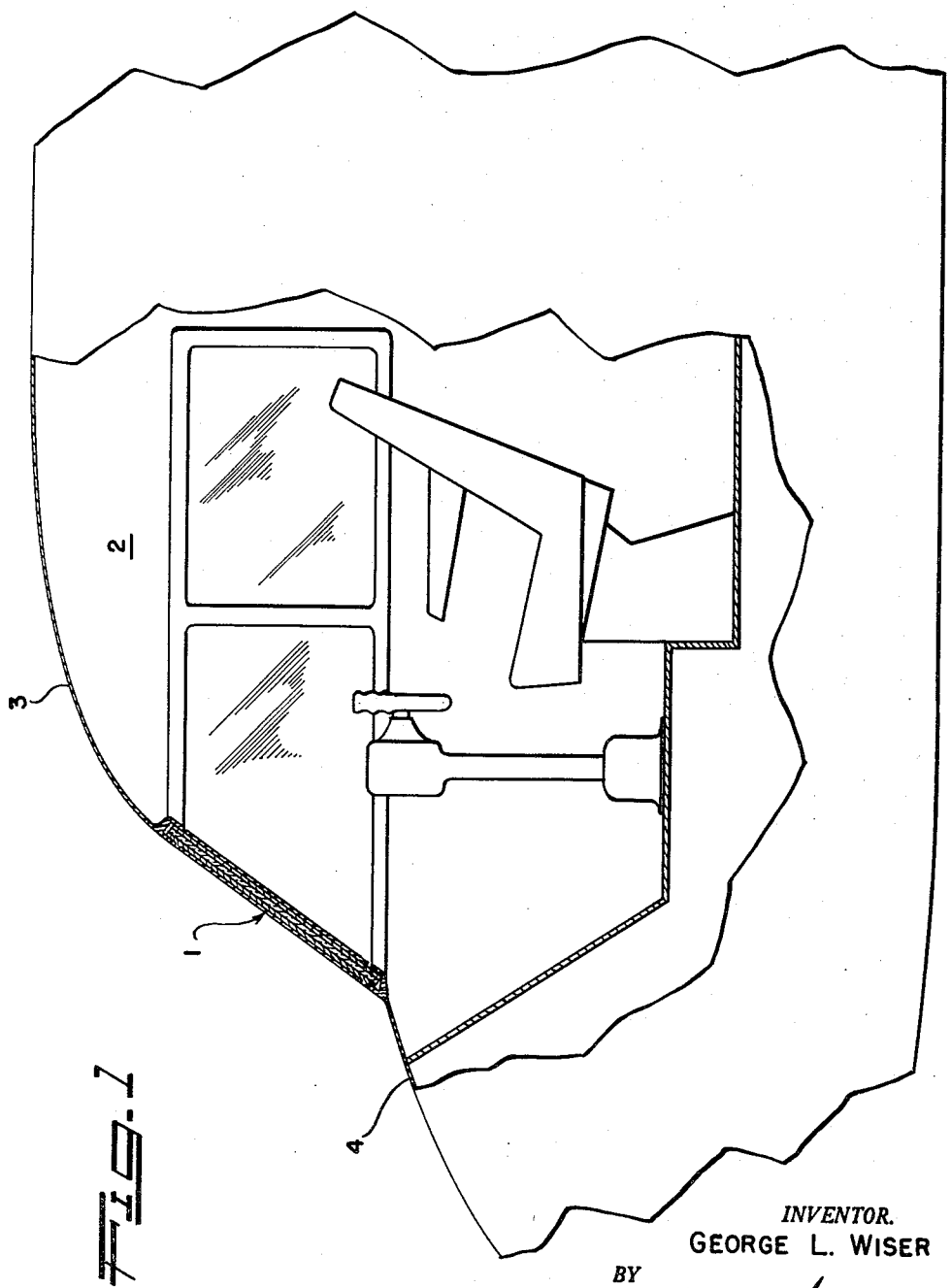
FIGURE 1 is a fragmentary sectional sideview of an aircraft cockpit enclosure employing the windshield construction of this invention.

Referring to FIGURE 1, windshield 1 constructed according to the teachings of this invention is shown serving as a part of the cockpit enclosure 2 of an aircraft 3. The location of the windshield in the forward portion of the fuselage of the aircraft near the nose portion 4 make it vulnerable to contact with small flying objects such as birds or the like moving at high velocities relative to the aircraft. In order to avoid serious injury to persons within the cockpit enclosure and to provide an adequate degree of flight safety, it is recognized as a requirement to provide a windshield which is capable of withstanding the impact load of objects with which it might come into contact during flight without rupturing and allowing ram air to enter the enclosure. It is also important, however, that the windshield, in resisting the impact load to which it may be subjected not shatter and spray fragments thereof at high energy levels into the cockpit inasmuch as these particles can damage instruments and equipment and inflict severe and incapacitating injury to personnel.

Figure 2:
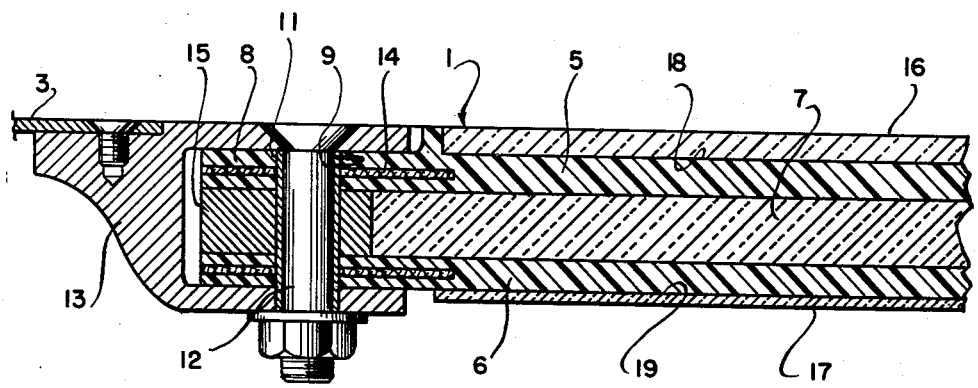
FIGURE 2 is a fragmentary sectional sideview showing the construction details of the preferred embodiment for the windshield of this invention.

The windshield according to the preferred embodiment in FIGURE 2 includes a pair of layers 5 and 6 of a tough, resilient transparent vinyl material such as polyvinyl butyral. Interposed between vinyl layers 5 and 6 is a relatively thick layer 7 of a somewhat brittle, hard and nonresilient material such as tempered glass, polyester resin, methyl methacrylate resin or the like which is suitably bonded to the vinyl layers forming a unitary structure. The marginal edges 8 of laminated layers 5, 6 and 7 serve as an attaching flange which is provided with openings 9 formed transversely therethrough at spaced intervals for securing the windshield to the aircraft. According to conventional practice a sleeve 11 may be fitted into opening 9 for receiving a loosely fitting bolt 12 which secures the windshield to a mounting bracket 13 forming a part of the aircraft structure. Sufficient clearance between bolt 12 and sleeve 11 is normally provided to permit expansion and contraction of the windshied relative to the airframe due to changes in temperature.

Metal or cloth inserts 14 may be embedded into the edge portions of vinyl layers 5 and 6 if desired to increase the bearing strength of opening 9 and thus increase the safe load level of the edge attachment. An edge reinforcing insert 15 may also be employed with the hard, nonresilient layer 7 of glass or the like.

Layers 5, 6 and 7 transmit all the loads on the windshield into the aircraft structure, however two additional layers 16 and 17 of transparent material are employed in the windshield construction to provide an optically satisfactory configuration. The tough, resilient vinyl layers 5 and 6 are relatively soft and incapable of maintaining a smooth, plane surface as is required to avoid optical distortion, unless confined by intimate contact with a rigid transparent material having good optical properties.

Outside surface layer 16 should be a rigid and nonresilient material of the same type which is suitable for layer 7 so that when bonded to the outer or external surface 18 of vinyl layer 5, it will confine the vinyl layer and prevent the same from resonating in a normal vibration environment. This hard and nonresilient outermost layer 16 of the windshield also provides a low air drag and relatively scratch-resistant surface. By terminating layer 16 short of the edge attachment flange 8, it will not be required to serve in transmitting the windshield loads into the aircraft structure, and hence it may be made relatively thin as compared with the thickness of the structurally loaded layer 7.

Inside surface layer 17 which is bonded to the innermost surface 19 of vinyl layer 6 should be a rigid, nonresilient material such as polyester resin or methyl methacrylate resin or the like rather than glass though the latter is perhaps acceptable in some cases. Layer 17 like layer 16 terminates short of the edge attachment flange 8 so that it will not be subjected to concentrated edgewise loads in transmitting the stresses in the windshield to the aircraft structure. The primary function of inner layer 17 is to stabilize and confine vinyl layer 6 to maintain good optical characteristics. The thickness of layer 17 should be no greater than is required to withstand normal handling of the windshield without cracking, not only to minimize the weight of the windshield, but also to present a small mass on the enclosure side of the windshield whereby breakage due to impact loads of birds or other flying objects will not release particles at a high energy level into the enclosure which are capable of inflicting injury to personnel or damage to equipment. An upper limit on the thickness of layer 17 should be established in each specific design so that the mass weight per unit area of the layer is equal to or less than that required for self delamination under the maximum anticipated impact loads.

An understanding of the manner in which the windshield construction is capable of preventing the entry of flying objects into the enclosure as well as preventing fragments of the windshield from being hurled off into the cockpit enclosure endangering personnel and equipment can best be obtained from a description of the functional operation of the various layers making up the windshield when an impact load is applied. Assuming an impact load is applied externally to the windshield as a result of contact with a flying object, the hard outer layer 16 will normally shatter as vinyl layer 5 deflects to absorb the load. In absorbing the load and preventing the entry into the enclosure of the flying object and fragments of broken layer 16, vinyl layer 5 is forced against the hard and nonresilient layer 7 causing it to also break or peel, hurling fragments thereof into vinyl layer 6. By securing the edges of layer 6 to the windshield mounting bracket 13, it forms a resilient bag-like container for the high energy particles hurled off layer 7. Absorption of the energy in the particles hurled from layer 7 will, if the impact load is sufficient, also shatter the hard inner layer 17, however, because it is relatively thin, the fragments are small and of a low energy level so that rather than showering the cockpit enclosure with high energy particles the fragments remain secured to layer 6 or fall harmlessly to the floor. By not end loading layer 17 the stresses in the bond between layers 6 and 17 are minimized and those which are present are distributed over a large area for absorption into the airplane structure through layers 5, 6 and 7.

Figure 3:
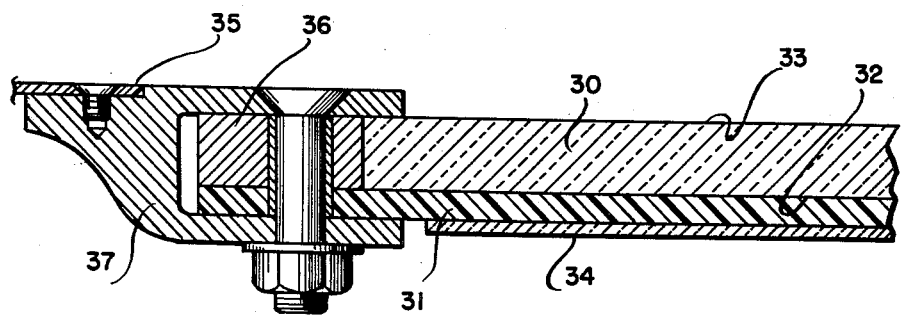
FIGURE 3 is a fragmentary sectioinal sideview showing a modified construction for the windshield of this invention.

A modified windshield construction employing the teachings of this invention is shown in FIGURE 3 wherein a solid, thick outer layer 30 of tempered glass or methyl methacrylate resin or the like is employed in lieu of layers 5, 7 and 16 in the FIGURE 2 configuration. A layer 31 of tough, resilient transparent vinyl material such as polyvinyl butyral corresponding to layer 6 in FIGURE 2 is bonded to the inner surface 32 of layer 30 to prevent objects striking the outer surface 33 from penetrating the transparent enclosure and for containing the fragments of layer 30. It is also important in this configuration that the inner vinyl layer 31 be secured at its edges to the aircraft structure to form an effective shield. A relatively thin and rigid, transparent inner layer 34 such as glass, polyester resin or methyl methacrylate resin is bonded to vinyl layer 31 to perform the same function as layer 17 in the FIGURE 2 configuration, that is to eliminate optical distortion from the surface of the vinyl layer. The low mass of the unloaded inner layer 34 allows the bonding adhesive between vinyl layer 31 and inner layer 34 to resist the impact load of a flying object striking the windshield without showering the inside of the enclosure with high energy fragments.

As shown in FIGURE 3, inner layer 34 like inner layer 17 in FIGURE 2 is smaller in plan form size than the other layers in the laminated windshield construction and does not form a part of the edge attachment flange 36 whereby all loads between the windshield and mounting bracket 37 are transmitted exclusively by layers 30 and 31. By freeing inner layer 34 from end loads in this manner, the tendency for it to break loose from vinyl layer 31 is materially decreased and the loads applied thereto may be more efficiently distributed over the entire area of the inner layer for effectively preventing the release of high speed particles inside the enclosure.

The term "windshield" as used herein is intended to include any transparent enclosure which may be subject to forces exceeding the ultimate yield strength of the material. Moreover, while the windshield construction is described herein in connection with aircraft, it is obviously equally useful, without departing from the teachings of the invention, on any vehicle or structure employing a transparent enclosure wherein the protection of personnel or equipment against high impact loads applied externally of the enclosure is desired.

It is to be understood that certain alterations, modifications and substitutions may be made to the instant disclosure without departing from the spirit and scope of the invention as defined by the appended claims.

I claim:

1. A high impact strength windshield construction for cockpit enclosure on aircraft or the like comprising, inner and outer resilient layers of transparent material, a rigid layer of transparent material interposed between the inner and outer resilient layers and laminated thereto forming a unitary non-homogeneous structure, the marginal edges of said inner and outer resilient layers being substantially coterminous and forming an attaching flange for the windshield, and rigid surface stabilizing layers of transparent material laminated to the inner and outer resilient layers to minimize optical distortion, the surface stabilizing layer laminated to said inner resilient layer being thinner than the other layers and having a thickness providing a mass weight per unit area less than that required for self delamination under the maximum anticipated impact loads, the last mentioned surface stabilizing layer having its marginal edge terminating short of said attaching flange on said resilient layers and being held in place only by the surface bond between the stabilizing layer and the resilient layer whereby the stabilizing layer is isolated from the edgewise enclosure supporting loads.

2. A transparent enclosure comprising, a main load assuming transparent panel presenting two opposite surfaces, one an external surface and the other an internal surface, an interlayer of transparent polyvinyl butyral laminated to said internal surface and forming a protective shield, and a thin stabilizing layer of transparent plastic material superimposed on the interlayer and having its entire inner surface bonded thereto, said stabilizing layer being harder and less flexible than the interlayer for minimizing optical distortion, said panel and interlayer having substantially coterminous margins extending beyond the edge of said stabilizing layer to mount the enclosure whereby the stabilizing layer is substantially free of concentrated enclosure supporting edgewise loads, said stabilizing layer being thinner than said interlayer and having a thickness providing a mass weight per unit area less than that required for self delamination under the maximum anticipated load conditions.

3. In a transparent enclosure having a main load assuming transparent panel presenting two opposite surfaces, one an external surface and the other an internal surface, a crew shield comprising, an interlayer of resilient transparent polyvinyl butyral laminated to the internal surface of the main load assuming panel, the panel and said interlayer having substantially coterminous margins for attaching the panel and interlayer to enclosure supporting structure whereby the interlayer serves as a protective shield decelerating fragments released by the panel on failure thereof due to the application of destructive impact loads, and a surface stabilizing layer of transparent material securely bonded to the free surface of the interlayer and being harder and less flexible than the interlayer for minimizing optical distortion of the shield, said surface stabilizing layer being thinner than said interlayer and terminating short of the marginal edge thereof whereby the surface stabilizing layer is substantially free of concentrated enclosure supporting edgewise loads.

4. A transparent protective shield for use with transparent enclosures subject to failure under externally applied impact loads comprising, an interlayer of tough, transparent and resilient vinyl material secured to the innermost surface of the enclosure for decelerating enclosure fragments released on failure of the enclosure, and a surface stabilizing layer of transparent material bonded to the interlayer and being harder and less flexible than the interlayer for minimizing optical distortion of the shield, said interlayer having its marginal edge extending beyond the stabilizing layer and forming a flange to attach the shield to the enclosure supporting structure, said stabilizing layer being thinner than said interlayer.

5. A transparent protective shield as defined in claim 4 including an edge reinforcing insert embedded in said flange on the interlayer.

References Cited in the file of this patent

UNITED STATES PATENTS

| | | |
|---|---|---|
| 2,079,048 | Spencer | May 4, 1937 |
| 2,184,876 | Sherts | Dec. 26, 1939 |
| 2,239,527 | Kamerer | Apr. 22, 1941 |
| 2,293,656 | McClain | Aug. 18, 1942 |
| 2,351,991 | McClain | June 20, 1944 |
| 2,401,552 | Cox | June 4, 1946 |
| 2,464,826 | Neher et al. | Mar. 22, 1949 |
| 2,567,353 | Ryan | Sept. 11, 1951 |
| 2,572,947 | Pevney | Oct. 30, 1951 |
| 2,659,686 | Watkins | Nov. 17, 1953 |
| 2,808,355 | Christie et al. | Oct. 1, 1957 |